United States Patent
Matsumura

[11] Patent Number: 5,915,353
[45] Date of Patent: Jun. 29, 1999

[54] CYLINDER DIRECT INJECTION SPARK-IGNITION ENGINE

[75] Inventor: Motohiro Matsumura, Yokohama, Japan

[73] Assignee: Nissan Motor Co., Ltd, Yokohama, Japan

[21] Appl. No.: 09/076,075

[22] Filed: May 12, 1998

[30] Foreign Application Priority Data

May 21, 1997 [JP] Japan .................................... 9-131199
Jun. 2, 1997 [JP] Japan .................................... 9-144174

[51] Int. Cl.$^6$ ...................................................... F02B 15/00
[52] U.S. Cl. ...................... 123/298; 123/305; 123/188.14
[58] Field of Search .................................... 123/295, 298, 123/302, 305, 188.14

[56] References Cited

U.S. PATENT DOCUMENTS

| | | | |
|---|---|---|---|
| 5,259,348 | 11/1993 | Kobayashi et al. | 123/305 |
| 5,291,865 | 3/1994 | Sasaki | 123/308 |
| 5,533,482 | 7/1996 | Naitoh | 123/305 |
| 5,553,588 | 9/1996 | Gono et al. | 123/276 |
| 5,704,333 | 1/1998 | Okumura et al. | 123/308 |
| 5,713,325 | 2/1998 | Yoshida et al. | 123/305 |
| 5,720,253 | 2/1998 | Matoba et al. | 123/305 |
| 5,735,240 | 4/1998 | Ito et al. | 123/302 |
| 5,740,777 | 4/1998 | Yamamoto et al. | 123/305 |
| 5,775,288 | 7/1998 | Suzuki et al. | 123/305 |
| 5,775,289 | 7/1998 | Yoshida et al. | 123/305 |
| 5,799,638 | 9/1998 | Tsuchida et al. | 123/302 |

*Primary Examiner*—Erick R. Solis
*Attorney, Agent, or Firm*—Foley & Lardner

[57] ABSTRACT

A cylinder direct injection spark-ignition engine in which fuel is directly injected into each cylinder. The engine comprises intake and exhaust valves movably disposed to a cylinder head. A piston is movably disposed in a cylinder in a cylinder block so as to define a combustion chamber. The piston is formed at its piston crown with a generally circular cavity having a center axis which is offset from a center axis of the piston toward the intake valve. A spark plug is provided such that its tip end section is disposed above a part of a peripheral portion of the circular cavity which part is located closer to the center axis of the piston than to periphery of the piston. A device for generating swirl of intake air in the combustion chamber is provided. A fuel injector valve is provided to directly inject fuel into the combustion chamber and has an axis which inclines relative to a bottom flat surface of the cylinder head and gradually approaches the bottom flat surface in a direction from the intake valve to the exhaust valve. The fuel injector valve has a fuel ejection hole whose axis inclines relative to the axis of the fuel injector valve so as to form a first angle which is smaller than a second angle formed by the axis of the fuel injector valve, relative to the bottom flat surface of the cylinder head.

40 Claims, 5 Drawing Sheets

CYLINDER DIRECT INJECTION SPARK-IGNITION ENGINE

The contents of Japanese Patent Application No.9-131199, with a filing date of May 21, 1997 in Japan, and Japanese Patent Application No. 9-144174, with a filing date of Jun. 2, 1997 are hereby incorporated by reference.

BACKGROUND OF THE INVENTION

1. Field of the Invention

This invention relates to improvements in a cylinder direct injection spark-ignition engine in which fuel (such as gasoline) is directly injected into a cylinder, and more particularly to the improvements for achieving effective stratified charge combustion and effective homogeneous charge combustion in such an engine.

2. Description of the Prior Art

Cylinder direct injection spark-ignition engines for an automotive vehicle have been known, in which fuel is directly injected into an engine cylinder to be ignited by a spark plug. One of them is disclosed in U.S. Pat. No. 5,553,588 entitled "Spark-ignited Direct Cylinder Fuel Injection Engine" and configured as follows: The engine has two intake ports for each cylinder, in which one of the intake ports is provided with a swirl control valve. Each piston is formed at its piston crown with a cavity forming part of a combustion chamber defined between the piston and a cylinder head. Fuel is injected from a fuel injector valve toward the cavity in the compression stroke thereby locally forming a layer of combustible air-fuel mixture around the spark plug, thus achieving stratified charge combustion. Additionally, under a certain engine operating condition, fuel is injected in the intake stroke to disperse fuel inside the combustion chamber thereby forming a homogeneous air-fuel mixture, thus accomplishing homogeneous charge combustion.

In order to accomplish effective stratified charge combustion in the cylinder direct injection spark-ignition engine, it is necessary to form stratified charge or air-fuel mixture inside the cylinder. In this regard, with the above conventional engine, atomized fuel injected from the fuel injector valve in the compression stroke is vaporized inside the cavity at the piston crown and carried to the vicinity of the spark plug under the action of gas flow (in the combustion chamber) regulated by the swirl control valve and under the action of a spray penetration force as a characteristic of the fuel injector valve. Thus, it is made possible to ignite a stratified air-fuel mixture, thereby accomplishing lean combustion.

However, the gas flow inside the cylinder is based on suction and compression of intake air under movement of the piston, and therefore the speed of the gas flow increases with an increase in engine speed or an increase in piston speed. Consequently, in the case of stratified charge combustion, it is required to keep air-fuel mixture around the spark plug in a good condition without being dispersed during a time period between a fuel injection timing and a spark ignition timing because the distance between the fuel injector valve and the spark plug is fixed.

In order to securely carry atomized fuel to the vicinity of the spark plug under strong gas flow, a sufficient fuel spray penetration force is required. This requirement can be met by concentrating the spray of atomized fuel, for example, by narrowing a spray angle of the fuel spray. However, concentration of the fuel spray tends to form a rich air-fuel mixture mass in the combustion chamber, so that soot is produced in the combustion chamber causing the spark plug to become sooty. In this regard, the magnitude of the gas flow in the combustion chamber increases in proportion to engine speed. Transportation control of stratified air-fuel mixture depends on the respective parameters of the gas flow and the fuel spray penetration force, in which a transportation system becomes stable by being controlled depending on the parameter of the fuel spray penetration force. However, in order to enhance a horizontal velocity component (directed to the spark plug), it is required to minimize the spray angle so as to increase the degree of concentration of the fuel spray. This invites problems such as production of soot in the combustion chamber.

Further, in order to accomplish effective homogeneous combustion in the cylinder direct injection spark-ignition engine, it is necessary to effectively vaporize atomized fuel and mix the atomized fuel with air preventing adhesion of the fuel to the wall of the combustion chamber. In view of this, it is proposed to make fuel injection at the initial stage of intake stroke to ensure a time for vaporizing fuel, which tends to improve the condition of air-fuel mixture in the combustion chamber and to increase power output of the engine. However, in case that the atomized fuel contacts the piston and the wall of the combustion chamber in a high concentration degree state of the fuel spray before dispersion of the fuel spray when the piston is near the top dead center, the atomized fuel adheres to the surface of the piston and of the combustion chamber wall thereby producing soot while inviting exhaust gas temperature rise and power output degradation due to insufficient mixing of fuel with air.

Otherwise, it has been proposed to form a deep cavity at the piston crown to increase the relative distance between the piston crown surface and a fuel injection position at the same fuel injection timing for the purpose of preventing interference of fuel spray with the piston. However, this increases the surface area of the combustion chamber so as to increase heat loss of the engine while impeding gas flow inside the cylinder, thus lowering power output of the engine.

BRIEF SUMMARY OF THE INVENTION

It is an object of the present invention to provide an improved cylinder direct injection spark-ignition engine which can overcome drawbacks encountered in conventional cylinder direct injection spark-ignition engines.

Another object of the present invention is to provide an improved cylinder direct injection spark-ignition engine which achieves both effective stratified charge combustion and effective homogeneous charge combustion in a combustion chamber, in accordance with engine operating conditions.

A further object of the present invention is to provide an improved cylinder direct injection spark-ignition engine in which a penetration force of sprayed fuel toward a spark plug is enhanced without causing concentration of the sprayed fuel thereby effectively forming stratified charge in a combustion chamber, while effectively preventing the sprayed fuel from adhering to the surface of the combustion chamber so as to disperse the sprayed fuel in the combustion chamber thereby effectively forming homogeneous charge in the combustion chamber.

An aspect of the present invention resides in a cylinder direct injection spark-ignition engine which comprises intake and exhaust valves movably disposed to a cylinder head which defines a combustion chamber. A fuel injector valve is provided to directly inject fuel into the combustion chamber. The fuel injector valve has an axis which inclines relative to a bottom flat surface of the cylinder head and gradually approaches the bottom flat surface in a direction from the intake valve to the exhaust valve. The fuel injector valve has a fuel ejection hole whose axis inclines relative to the axis of the fuel injector valve so as to form a first angle which is smaller than a second angle formed by the axis of the fuel injector valve, relative to the bottom flat surface of the cylinder head.

Another aspect of the present invention resides in a cylinder direct injection spark-ignition engine which comprises intake and exhaust valves movably disposed to a cylinder head. A piston is movably disposed in a cylinder in a cylinder block so as to define a combustion chamber. The piston is formed at its piston crown with a generally circular cavity having a center axis which is offset from a center axis of the piston toward the intake valve. A spark plug is provided such that its tip end section is disposed above a part of a peripheral portion of the circular cavity which part is located closer to the center axis of the piston than to periphery of the piston. A device for generating swirl of intake air in the combustion chamber is provided. A fuel injector valve is provided to directly inject fuel into the combustion chamber and has an axis which inclines relative to a bottom flat surface of the cylinder head and gradually approaches the bottom flat surface in a direction from the intake valve to the exhaust valve. The fuel injector valve has a fuel ejection hole whose axis inclines relative to the axis of the fuel injector valve so as to form a first angle which is smaller than a second angle formed by the axis of the fuel injector valve, relative to the bottom flat surface of the cylinder head.

A further aspect of the present invention resides in a cylinder direct injection spark-ignition engine which comprises a cylinder block having a plurality of cylinders. A cylinder head is fixedly mounted on a block deck of the cylinder block. The cylinder head has first and second intake ports and first and second exhaust ports for each cylinder. A fuel injector valve is provided to directly inject fuel into the combustion chamber. The fuel injector valve has an axis which inclines relative to a bottom flat surface of the cylinder head and gradually approaches the bottom flat surface in a direction from the intake valve to the exhaust valve. The fuel injector valve has a fuel ejection hole whose axis inclines relative to the axis of the fuel injector valve so as to form a first angle which is smaller than a second angle formed by the axis of the fuel injector valve, relative to the bottom flat surface of the cylinder head. A spark plug is disposed such that its tip end section is projected into the combustion chamber. A piston is movably disposed in the cylinder to define the combustion chamber between it and the cylinder head. The piston is formed at its piston crown with a generally circular cavity having a center axis which is offset from a center axis of the piston toward the intake valves. A swirl control valve is disposed to control air flow in the first intake port in accordance with an engine operating condition. In the above arrangement, the second intake port has an axis whose at least a major part is contained in a first vertical plane which inclines relative to a second vertical plane to form a first predetermined angle. The first vertical plane gradually approaches the center axis of the piston in a direction toward the combustion chamber relative to the vertical cross flow plane. The first and second vertical planes are vertical to the block deck of the cylinder block. The second vertical plane passes through the first intake and exhaust valves and is perpendicular to a third vertical plane containing the center axes of the cylinders and vertical to the block deck. The first intake and exhaust valves are located respectively on opposite sides of the third vertical plane.

According to the above arrangement of the cylinder direct injection spark-ignition engine according to the present invention, by virtue of the fuel ejection hole of the fuel injector valve which ejection hole is upwardly deflected to approach a horizontal direction, a largely deflected or generally horizontal velocity component of the fuel spray (in the shape of a cone) ejected from the fuel injector valve is enhanced as compared with a less deflected or generally vertical velocity component of the fuel spray. Consequently, the generally horizontal velocity component of the fuel spray is increased without decreasing the spray angle of the fuel spray, i.e., by minimizing sprayed fuel particles (contradictory to a fuel spray penetration force). This increases the fuel spray penetration force in a direction toward the spark plug thereby assisting advance of sprayed and atomized fuel to the vicinity of the spark plug. Accordingly, atomized fuel is vaporized under the effect of swirl gas flow and securely carried to the vicinity of the spark plug under the effect of the fuel spray penetration force enhanced in the direction toward the spark plug. As a result, stratified charge combustion can be achieved throughout a wide range of engine operating condition, effectively preventing soot from being produced in the combustion chamber and the spark plug from becoming sooty.

Besides, the fuel injector valve formed with the upwardly deflecting fuel ejection hole not only decreases the amount of the sprayed fuel toward the piston crown or directing generally downward but also lowers the velocity of the sprayed fuel thereby to prevent the sprayed fuel from interfering with the piston crown. Additionally, fuel spray from the fuel injector valve is deflected upward to approach the horizontal direction, and therefore the flowing direction of the fuel spray crosses that of intake air introduced through an intake valve into the combustion chamber at a large crossing angle thereby promoting mixing of fuel and intake air. Further, the fuel directed to the flow of intake air is increased not only in amount but also in flow velocity, thus further promoting mixing between fuel and intake air.

As a result, even if fuel is injected from the fuel injector valve at the initial stage of intake stroke without forming a deep cavity at the piston crown, the interference of the sprayed fuel with the piston is suppressed to avoid formation of liquid film of fuel on the piston crown surface thereby preventing production of soot in the combustion chamber. Such fuel injection at the initial stage of the intake stroke allows for ensuring a time for evaporating fuel while increasing the crossing angle between the flowing direction of the sprayed fuel and that of intake air thereby promoting mixing of the sprayed fuel and intake air and vaporization of the fuel. This improves antiknock characteristic and volumetric efficiency of the engine, and additionally maintains combustion temperature at a high level thereby to lower exhaust gas temperature. It is unnecessary to deepen the cavity formed at the piston crown, and therefore the surface area of the combustion chamber is not increased unnecessarily so as to increase power output of the engine while preventing heat loss of the engine. Thus, homogeneous charge combustion can be effectively achieved in the combustion chamber.

DETAILED DESCRIPTION OF THE INVENTION

Referring now to FIGS. 1 to 5 of the drawings, an embodiment of a cylinder direction injection spark-ignition (gasoline-fueled) engine according to the present invention is illustrated by the reference character E. The engine E of this embodiment is for an automotive vehicle and has a plurality of engine cylinders C formed in a cylinder block 3 though only one cylinder C is shown. A piston is movably disposed in each cylinder C to define a combustion chamber 1 between it and a cylinder head 2 which is secured at its bottom flat surface to the block deck (cylinder upper-deck) or top flat surface T of the cylinder block 3.

The cylinder head 2 is formed with two (first and second) intake ports 5A, 5B and two exhaust ports E1, E2 (shown in FIG. 2) for each cylinder C or for each combustion chamber 1. The two intake ports 5A, 5B are located at an opposite side of a vertical cylinder head plane P with respect to the two exhaust ports E1, E2, in which the vertical cylinder head plane P contains the center axes (not shown) of the cylinders C. The intake ports 5A, 5B have respectively downstream ends (opened to the combustion chamber 1) at which two intake valves 6A, 6B are respectively movably disposed. The exhaust ports E1, E2 have respectively upstream ends (opened to the combustion chamber 1) at which two exhaust valves 7A, 7B are respectively movably disposed.

Figure 1:
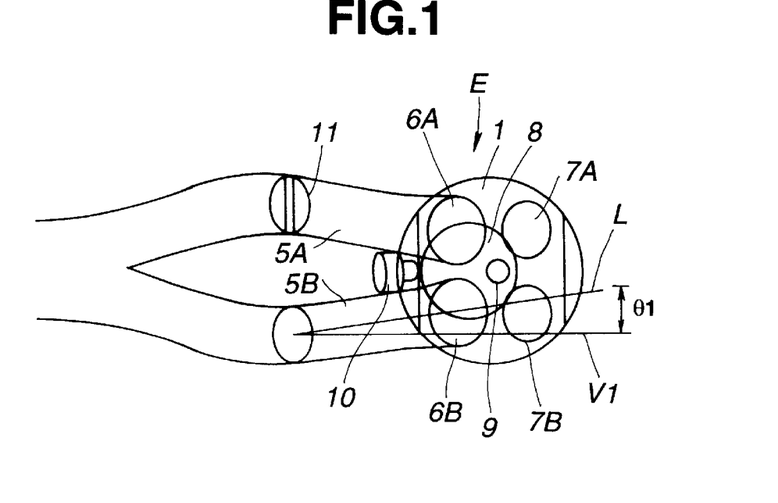
FIG. 1 is a fragmentary schematic plan view of an embodiment of a cylinder direct injection spark-ignition engine according to the present invention.
Figure 2:
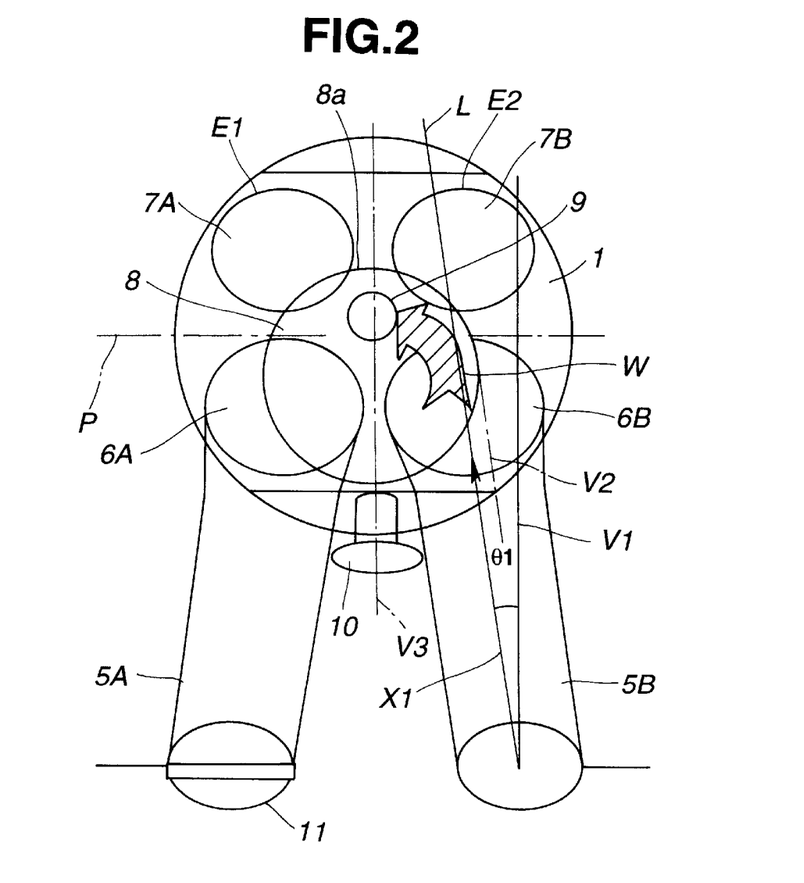
FIG. 2 is an enlarged fragmentary schematic plan view of the engine of FIG. 1.
Figure 3:
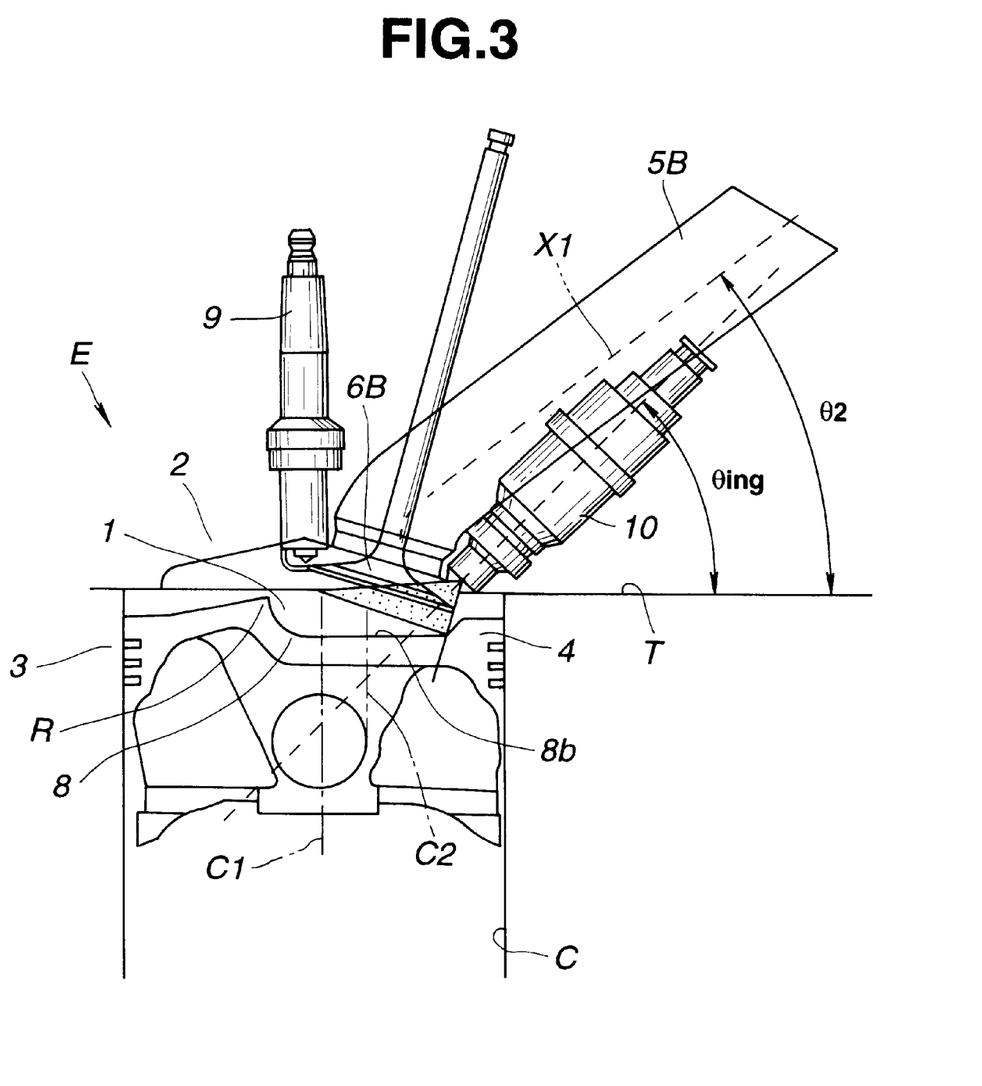
FIG. 3 is an enlarged fragmentary schematic vertical sectional view of the engine of FIG. 1.

The piston 4 is formed at its piston crown with a circular cavity or depression 8 forming part of the combustion chamber 1. More specifically, the cavity 8 is formed at the top surface of the piston crown and shallow or flat so that its bottom surface 8b is generally flat. The center axis C2 of the cavity 8 is generally parallel with and offset from the center axis CI of the piston 4 toward the intake valves 6A, 6B, i.e., located closer to the intake valves 6A, 6B than to the exhaust valves 7A, 7B. The periphery 8a of the cavity 8 is generally circular as viewed from above as seen in FIG. 2. A part of the periphery 8a of the cavity 8 is raised over the other part of the periphery 8a to form a ridgeline R as shown in FIG. 3, the part being located at an opposite side of an imaginary vertical plane (not shown) containing the center axis C2, with respect to a side in which a fuel injector valve 10 is located.

A spark plug 9 is installed to the cylinder head 2 so that its tip end section (having electrodes) projects into the combustion chamber 1 and located above a part of the peripheral annular portion of the circular cavity 8. The spark plug 9 is positioned generally along the center axis C1 of the cylinder C. Specifically, the axis of the spark plug 9 is slightly offset from the center axis C1 of the cylinder C toward the exhaust valves 7A, 7B.

The fuel injector valve 10 is disposed between the first and second intake ports 5A, 5B as viewed from the above as shown in FIG. 2 and positioned to inject fuel (gasoline) directly into the combustion chamber 1. The fuel injector valve 10 is installed to be directed obliquely downward and extends in a direction from the intake valves 6A, 6B to the exhaust valves 7A, 7B. Specifically, the fuel injector valve 10 is positioned such that its axis (indicated by a dotted line) forms a predetermined angle θinj relative to the top flat surface T of the cylinder block 3 (or relative to the bottom flat surface of the cylinder head 2) and is directed to the bottom surface 8b of the cavity 8. The predetermined angle θinj is within a range of from 35 degrees to 45 degrees, preferably about 45 degrees. Accordingly, the fuel injector valve 10 injects fuel in an obliquely downward direction or toward the cavity 8. The fuel injector valve 10 is arranged to inject fuel at a fuel injection timing which is set, in this embodiment, in the compression stroke under the engine operating condition in which stratified charge combustion is to be carried out.

Figure 4:
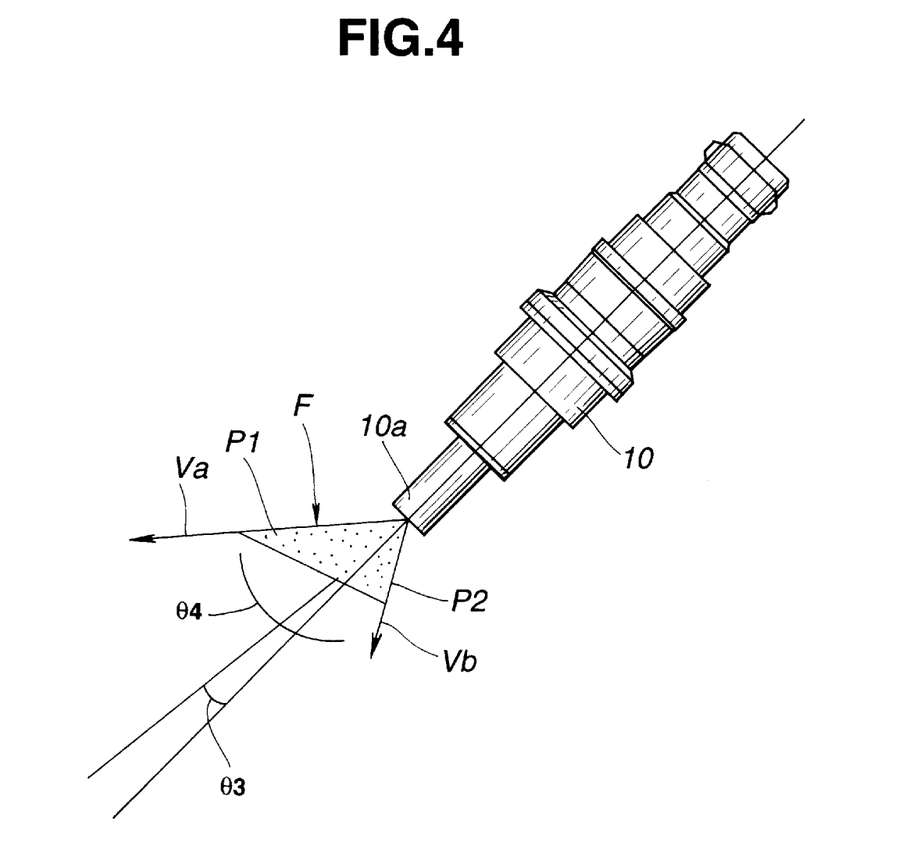
FIG. 4 is an enlarged side view of a fuel injector valve used in the engine of FIG. 1, showing function of the fuel injector valve.
Figure 5:
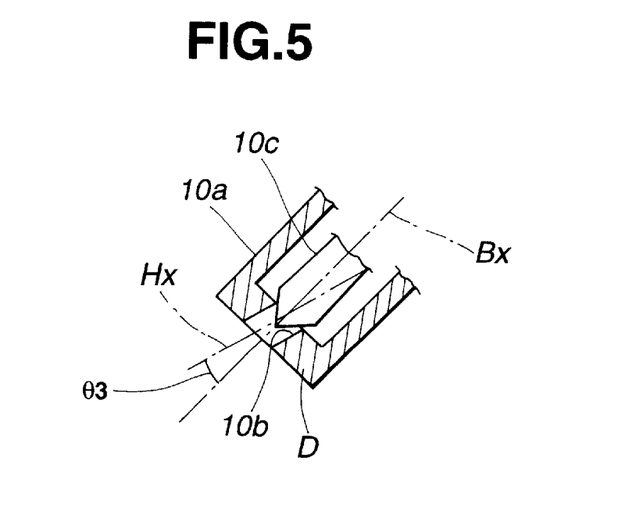
FIG. 5 is a fragmentary enlarged sectional view of the tip end section of the fuel injector valve of FIG. 4.

As shown in FIGS. 4 and 5, the fuel injector valve 10 includes a generally cylindrical valve body 10a whose tip end section projects into the combustion chamber 1 to inject fuel into the combustion chamber 1. A needle valve 10c is axially movably disposed inside and coaxial with the cylindrical valve body 10a. The needle valve 10c has a generally conical tip end section having a conical surface. The tip end section of the valve body 10a includes an end wall D to which the axis of the fuel injector valve 10 is perpendicular. The end wall D is formed with a fuel ejection hole or through-hole 10b through which fuel inside the valve body 10a is ejected. An annular portion (not identified) of the end wall D around the upstream end of the fuel injector hole 10b serves as a valve seat section to which the conical tip end section of the needle valve 10c is contactable or capable of being seated. The fuel ejection hole 10b is machined or formed such that the axis Hx of the fuel ejection hole 10b inclines or deflects relative to the axis Bx of the needle valve 10c and of the valve body 10a to form a smaller angle relative to the top flat surface T of the cylinder block 3 than the predetermined angle θinj of the axis Bx relative to the cylinder block top flat surface T. A predetermined angle (fuel ejection hole deflection angle) θ3 is formed between the axis Hx of the fuel ejection hole 10b and the axis Bx of the fuel injector valve valve body 10a. Thus, the axis Hx of the fuel ejection hole 10b is deflected to close to a horizontal direction relative to the axis of the fuel injector valve 10. As a result, fuel ejected from the fuel ejection hole 10b takes the shape of a hollow spray cone F shown in FIG. 4, in which the spray cone F has a spray angle θ4. Under the effect of the configuration of the fuel ejection hole 10b, the flow velocity at the upper part P1 of the spray cone F is higher than that at the lower part P2 of the spray cone F. Thus, the spray cone F of fuel ejected from the fuel ejection hole 10b is deflected upward relative to the axis of the fuel injector valve 10, in which the sprayed fuel is slightly concentrated in the direction corresponding to the upper part P1.

A swirl control valve 11 is movably disposed to block the first intake port 5A and arranged to be controllably opened or closed in accordance with an engine operating condition. In this embodiment, the swirl control valve 11 is controlled to be generally fully closed, in a predetermined engine operating condition in which stratified charge combustion is to be carried out. The swirl control valve 11 may be partly closed to control air flow in the first intake port 5A in another predetermined engine operating condition. The second intake port 5B is formed extending generally tangentially to the periphery 8a of the cavity 8. More specifically, a vertical port axis plane L containing the axis X1 (or at least a major part of the axis X1) of the second intake port 5B is inclined relative to a vertical cross flow plane V1 in a manner to gradually approach the center axis C1 of the piston 4 in a direction toward the combustion chamber 1, in which a predetermined angle (port inwardly directing angle) θ1 is formed between the vertical port axis plane L and the vertical cross flow plane V1. The predetermined angle θ1 is within a range of not smaller than 5 degrees and smaller than 15 degrees, preferably about 8 degrees. Additionally, the vertical port axis plane L is generally parallel with a vertical plane V2 containing a tangent line of the periphery 8a of the circular cavity 8 on an imaginary horizontal plane or the block deck T of the cylinder block 3. In this embodiment, the vertical port axis plane L is located inside the vertical plane V2 and extends passing through a space outside the spark plug 9 and inside relative to the periphery 8a of the circular cavity 8. It will be understood that the vertical port axis plane L, the vertical cross flow plane V1, and the vertical plane V2 are vertical to the block deck or top flat surface T of the cylinder block 3. The vertical cross flow plane V1 passes through the intake valve 6B and the exhaust valve 7B and is perpendicular to the cylinder axis plane P which contains the axes of the cylinders C. It will be understood that the cylinder axis plane P is vertical to the block deck T. Thus, in other words, the predetermined angle θ1 is an angle of inward inclination of the intake port 5B (more specifically, the intake port axis X1) relative to cross-flow horizontal direction V1. In a multi-cylinder engine, the predetermined angle θ1 may also be defined as a horizontally measured angle formed between the intake port axis X1 and line V1, where the line V1 is in a vertical plane that both extends through an intake valve 6B and an exhaust valve 7B and is perpendicular to the vertical cylinder axis plane P containing the center axes of the adjacent cylinders.

Additionally, the major part of straight part of the axis X1 of the second intake port 5B inclines downward in a direction toward the combustion chamber 1, in which the axis X1 forms a predetermined angle (port inclination angle) θ2 relative to the top flat surface T of the cylinder block 3 or relative to the bottom flat surface of the cylinder head 2. The predetermined angle θ2 is within a range of larger than 30 degrees and smaller than 40 degrees, preferably 38 degrees. Thus, the predetermined angle θ2 can be considered an intake port angle, since it is an angle between the intake port axis X1 and the top flat surface T of the cylinder block 3. It is to be noted that the first intake port 5A blockable with the swirl control valve 11 is formed and shaped generally symmetrical to the second intake port 5B with respect to a vertical central plane V3 which contains the center axis C2 of the cavity 8 and the center axis C1 of the piston 4 and parallel with the vertical cross flow plane V1, so that the axes of the first and second intake ports 5A, 5B gradually approach to each other in the direction toward the combustion chamber 1 as clearly shown in FIG. 2.

As shown in FIG. 2, the tip end (having the electrodes) of the spark plug 9 is located inside relative to the vertical port axis plane L containing the axis X1 of the second intake port 5B. In this embodiment, the spark plug 9 is positioned such that the vertical central plane V3 passes through the tip end section of the spark plug 9.

Next, a manner of operation of the thus arranged cylinder direct injection spark-ignition engine will be discussed.

Under an engine operating condition (for example, a low load engine operating condition) in which stratified charge combustion is to be carried out, the swirl control valve 11 is controlled to be generally fully closed to block the first intake port 5A. Accordingly, when the intake valves 6A, 6B lift and open in intake stroke in which the piston 4 descends, intake air is sucked into the combustion chamber 1 through the second intake port 5B which is not blocked by the swirl control valve 11, in which intake air is regulated in its flowing direction under the effect of the port inwardly directing angle θ1 and the port inclination angle θ2. The thus sucked intake air generates gas flow in the form of swirl in the combustion chamber 1 as indicated by an arrow W1 in FIG. 6. It is to be noted that the thus sucked intake air generates gas flow in the form of inclined swirl inside the cavity 8 formed at the piston crown as indicated by an arrow W in FIG. 2, in which the gas flow moves along the periphery 8a of the cavity 8. In this regard, the port inwardly directing angle θ1 and the port inclination angle θ2 are selected to put the above gas flow into an optimum state inside the cavity 8 formed at the piston crown of the piston 4. This gas flow is maintained until piston operation reaches the course of compression stroke.

Figure 6:
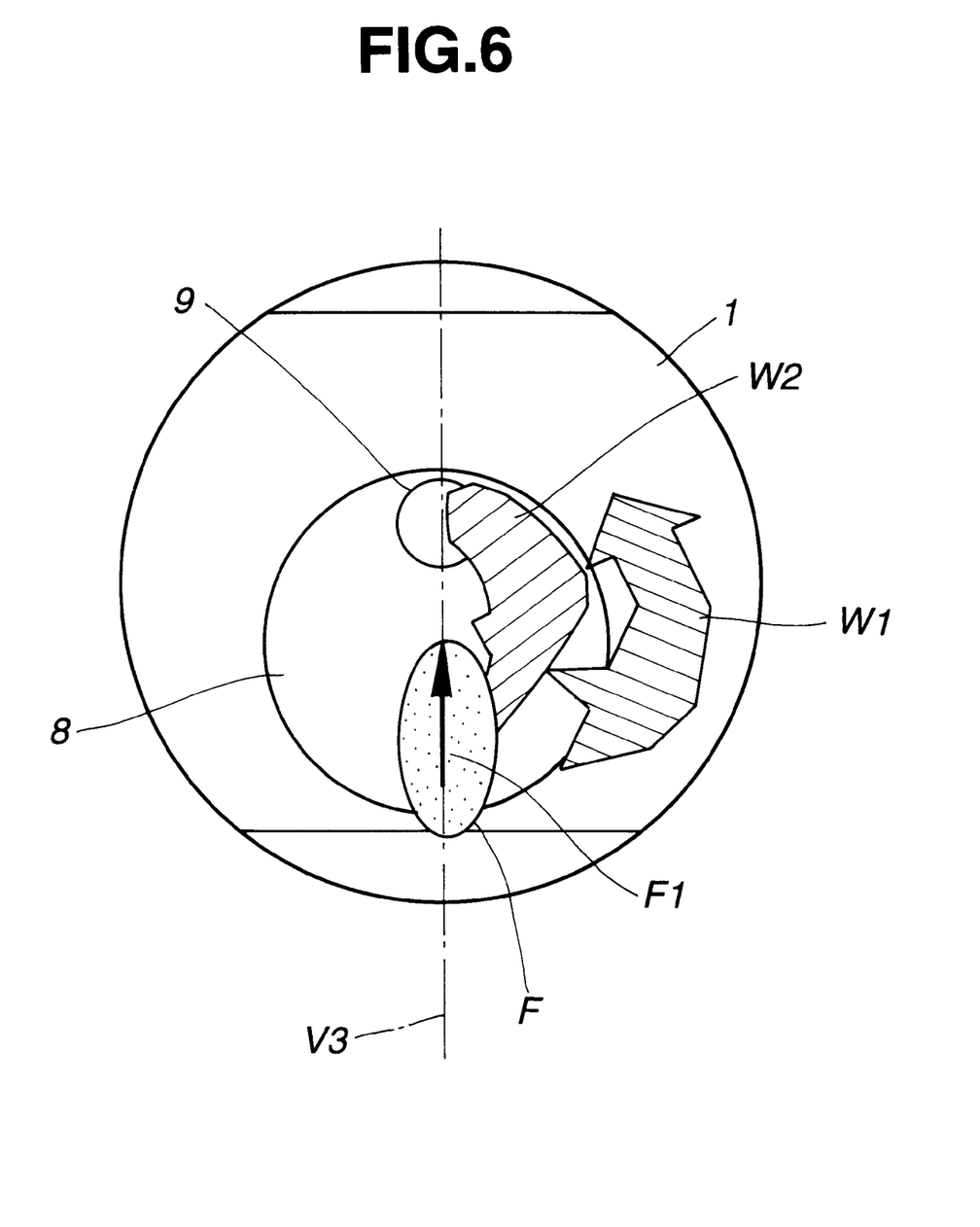
FIG. 6 is a schematic plan view of a combustion chamber of the engine of FIG. 1, illustrating a state in which stratified charge is being formed.

Subsequently, in the compression stroke, atomized fuel is injected from the fuel injector valve 10 under a condition in which the gas flow in the form of swirl has been maintained, so that a layer of combustible air-fuel mixture is formed inside the cavity 8 as indicated by the character W2 in FIG. 6 thus achieving formation of stratified charge or air-fuel mixture in the combustion chamber 1. Here, under the effect of the upwardly deflecting fuel ejection hole 10b of the fuel injector valve 10, injected fuel forms the spray cone F which is provided with a characteristics in which a generally 2, horizontal velocity component indicated by an arrow Va is larger than a generally vertical velocity component indicated by an arrow Vb as shown in FIG. 4. Accordingly, a high penetration force of the sprayed fuel toward the spark plug 9 can be maintained even under a condition in which the spray angle θ4 of atomized fuel is increased. As a result, even under a high engine speed condition in which the velocity of the swirl gas flow is high, injected fuel can be vaporized and carried to the vicinity of the electrodes of the spark plug 9, so that stratified charge or air-fuel mixture is formed in the combustion chamber thereby maintaining stable combustion even on lean air-fuel mixture. Thus, stratified charge can be securely formed near the electrodes of the spark plug 9 under a high velocity gas flow condition thereby achieving lean combustion throughout a wide range of engine operating conditions.

Under an engine operating condition (for example, medium and high load engine operating conditions) in which homogeneous charge combustion is to be carried out, the swirl control valve 11. is controlled to be generally fully opened to allow intake air to flow through the intake ports 5A, 5B. In the intake stroke where the piston initiates its descending movement, the intake valves 6A, 6B lift so that air flows into the combustion chamber 4 through the intake ports 5A, 5B. At the initial stage of the intake stroke, fuel is injected from the fuel injector valve 10. Here, the axis Hx of the fuel ejection hole 10b deflects upward relative to the axis Bx of the needle valve 10c or the axis of the fuel injector valve 10 by the fuel ejection hole deflection angle θ3 to approach a horizontal direction. Consequently, injected and atomized fuel takes the form of the spray cone F having the spray angle θ4. Additionally, injected fuel is slightly concentrated into the upper or largely deflected part P1 of the spray cone while the upper part P1 of the spray cone is higher in flow velocity than the lower part or less deflected part P2 of the spray cone. Consequently, the flow velocity of injected fuel in the generally vertical direction is suppressed even when the piston 4 is at a position near the fuel injected position at the initial stage of intake stroke, and therefore injected fuel can be prevented from striking against the surface of the piston crown in its liquid film state before its dispersion or atomization. This can effectively suppress production of soot in the combustion chamber 1.

As a result, it is made possible to advance a fuel injection timing of the fuel injector valve 10, which has been conventionally believed to allow soot to be generated. By virtue of this, a sufficient time for fuel vaporization and fuel-air mixing can be ensured thereby producing highly homogeneous air-fuel mixture particularly in a condition where a time for mixing fuel and air is insufficient at the same crankangle at a high engine speed.

In this regard, in a cylinder direct injection spark-ignition engine using a conventional fuel injector valve, a sufficient time for vaporization of fuel and mixing air and fuel is ensured particularly in a high engine speed condition by injecting fuel at the initial stage of intake stroke, thereby preventing combustion from being degraded owing to insufficient mixing between fuel and air thus to obtain good power output performance. However, since the piston becomes near a fuel injection valve at the initial stage of intake stroke, injected fuel unavoidably strikes against the surface of the piston crown before being well atomized or dispersed, in which vaporization of fuel is delayed owing to the surface tension of fuel at the piston crown surface while diffusion combustion occurs owing to oxygen shortage. This tends to easily produce soot in the combustion chamber. As a measure to overcome this problem, it has been proposed to increase the distance of the piston crown surface from the fuel injection position by forming a relatively deep cavity at the piston crown in order to prevent adhesion of liquid film of fuel to the piston crown surface. However, this increases unevenness at the piston crown surface thereby enlarging the surface area of the combustion chamber so as to increase heat loss while suppressing gas flow to promote combustion in the cylinder. This lowers a rate of combustion thus to degrade the thermal efficiency of the engine.

In contrast, according to the cylinder direct injection spark-ignition engine provided with the fuel injector valve 10 of the present invention, although the piston 4 is near the fuel injection position at the initial stage of intake stroke, injected fuel can be prevented from striking against the piston crown surface in its liquid film state before its atomization or dispersion thereby suppressing production of soot in the combustion chamber 1 because the flow velocity of injected fuel in the generally vertical direction is low. As a result, it can be made possible to advance the fuel injection timing of the fuel injector valve 10, which has been conventionally believed to allow soot to be generated, thereby prolonging a time for fuel vaporization and fuel-air mixing to produce highly homogeneous air-fuel mixture particularly in a condition where a time for mixing fuel and air is insufficient at the same crankangle under a high engine speed condition. This effectively suppresses production of soot in the combustion chamber while raising power output and thermal efficiency of the engine.

Effects of the fuel injector valve 10 of the present invention will be discussed with reference to a graph in FIG. 7.

Figure 7:
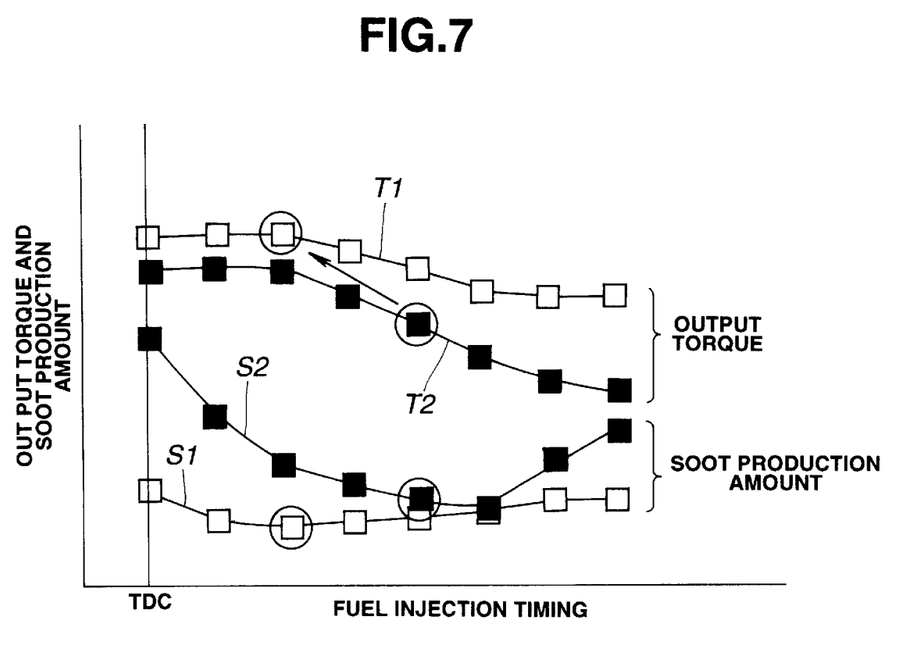
FIG. 7 is a graph showing the output toque and the soot production amount in terms of the fuel injection timing, obtained by experimental measurements conducted on a cylinder direct injection spark-ignition engine provided with the fuel injector valve of FIGS. 4 and 5 and the same engine equipped with a conventional fuel injector valve.

Experiments were conducted to obtain data of the graph of FIG. 7, on a cylinder direct injection spark-ignition engine provided with a fuel injector valve (shown in FIGS. 3 and 4) of the present invention for each cylinder, and on the same cylinder direct injection spark-ignition engine except for being provided with a conventional fuel injector valve for each cylinder. The conventional fuel injector valve was similar to the fuel injector valve shown in FIGS. 3 and 4 with the exception that a fuel ejection hole was configured such that its axis is aligned with the axis of a needle valve or the axis of the fuel injector valve.

In the experiments, output torque and amount of production of soot in the combustion chamber were measured for the respective engines at 4000 r.p.m. under a wide open throttle condition (at a fully opened position of a throttle valve), altering fuel injection timing of the fuel injector valves. The measured data of the output torque and the soot production amount were graphed out in FIG. 7 in which lines T1 and T2 indicate respectively the measured data of the output torque of the engine provided with the fuel injector valve of the present invention and the same data of the engine provided with conventional fuel injector valve; and lines S1 and S2 indicate respectively the measured data of the soot production amount of the engine provided with the fuel injector valve of the present invention and the same data of the engine provided with the conventional fuel injector valve. This graph depicts the fact that according to the present invention, the production amount of soot can be kept small while improving engine output torque even if the fuel injection timing is advanced to the initial stage of intake stroke.

What is claimed is:

1. A cylinder direct injection spark-ignition engine, comprising:

intake and exhaust valves movably disposed on a cylinder head which defines a portion of a combustion chamber; and a fuel injector valve for directly injecting fuel into the combustion chamber, the fuel injector valve having an axis inclined relative to a bottom surface of the cylinder head and th gradually approaches the bottom surface in a direction extending from an intake valve side of the combustion chamber toward an exhaust valve side of the combustion chamber, the fuel injector valve having a fuel ejection hole with an axis inclined relative to the axis of the fuel injector valve so as to form a first angle which is smaller than a second angle formed by the axis of the fuel injector valve and the bottom surface of the cylinder head, wherein the fuel injector valve is arranged such that fuel injected through the fuel ejection hole is formed into a shape of a spray cone having first and second sections which are opposite to each other with respect to a plane containing the axis of the fuel ejection hole, the first section being located closer to a surface of the cylinder head defining a portion of the combustion chamber than the second section, the first section having a higher flow velocity than the second section.

2. A cylinder direct injection spark-ignition engine, comprising:

intake and exhaust valves movably disposed on a cylinder head;

a piston movably disposed in a cylinder in a cylinder block so as to define a portion of a combustion chamber, the piston having a piston crown with a generally circular cavity having a center axis which is offset from a center axis of the piston toward the intake valve;

a spark plug having a tip end section disposed above a part of a peripheral portion of the circular cavity which part is located closer to the center axis of the piston than to a periphery of the piston;

a device for generating a swirl of intake air in the combustion chamber; and a fuel injector valve for directly injecting fuel into the combustion chamber, the fuel injector valve having an axis inclined relative to a bottom surface of the cylinder head and that gradually approaches the bottom surface in a direction extending from an intake valve side of the combustion chamber toward an exhaust valve side of the combustion chamber, the fuel injector valve having a fuel ejection hole with an axis inclined relative to the axis of the fuel injector valve so as to form a first angle which is smaller than a second angle formed by the axis of the fuel injector valve and the bottom surface of the cylinder head, wherein the fuel injector valve is arranged such that fuel infected through the fuel ejection hole is formed into a shape of a spray cone having first and second sections which are opposite to each other with respect to a plane containing the axis of the fuel ejection hole, the first section being located closer to a surface of the cylinder head defining a portion of the combustion chamber than the second section, the first section having a higher flow velocity than the second section.

3. A cylinder direct injection spark-ignition engine as claimed in claim 2, wherein the cylinder head has first and second intake ports and first and second exhaust ports for the cylinder, and the swirl generating device includes a swirl control valve disposed to control air flow in the first intake port in accordance with an engine operating condition.

4. A cylinder direct injection spark-ignition engine, comprising:

a cylinder block having a plurality of cylinders;

a cylinder head mounted on a block deck of the cylinder block, the cylinder head having first and second intake ports and first and second exhaust ports for at least one cylinder;

first and second intake valves movably disposed on the cylinder head, the first and second intake ports being closable respectively by the first and second intake valves, and first and second exhaust valves movably disposed on the cylinder head, the first and second exhaust ports being closable respectively by the first and second exhaust valves;

a fuel injector valve for directly injecting fuel into a combustion chamber in the at least one cylinder, the fuel injector valve having an axis inclined relative to the block deck of the cylinder block and that gradually approaches the block deck in a direction extending from an intake valve side of the combustion chamber toward an exhaust valve side of the combustion chamber, the fuel injector valve having a fuel ejection hole with an axis inclined relative to the axis of the fuel injector valve so as to form a first angle which is smaller than a second angle formed by the axis of the fuel injector valve and the block deck of the cylinder block;

a spark plug having a tip end section projecting into the combustion chamber;

a piston movably disposed in the at least one cylinder to define location of the combustion chamber between it and the cylinder head, the piston having a piston crown with a generally circular cavity having a center axis which is offset from a center axis of die piston toward the intake valves; and a swirl control valve disposed to control air flow in the first intake port in accordance with an engine operating condition;

wherein the second intake port has an axis with at least a major part contained in a first vertical plane inclined relative to a second vertical plane to form a first predetermined angle, the first vertical plane gradually approaching the center axis of the piston in a direction toward the combustion chamber relative to the second vertical plane, the first and second vertical planes being vertical to the block deck of the cylinder block, the second vertical plane passing through the first intake and exhaust valves and being perpendicular to a third vertical plane containing the center axes of the cylinders, the first intake and exhaust valves being located respectively on opposite sides of the third vertical plane.

5. A cylinder direct injection spark-ignition engine as claimed in claim 4, wherein the first vertical plane is generally tangential to a periphery of the circular cavity.

6. A cylinder direct injection spark-ignition engine as claimed in claim 4, wherein the first vertical plane is generally parallel with a fourth vertical plane containing a tangent line of a periphery of the circular cavity.

7. A cylinder direct injection spark-ignition engine as claimed in claim 4, wherein the tip end section of the spark plug is disposed above a peripheral portion of the circular cavity and located on an opposite side of the first vertical plane with respect to the second vertical plane.

8. A cylinder direct injection spark-ignition engine as claimed in claim 4, wherein the first vertical plane passes through a space between a periphery of the circular cavity and the spark plug.

9. A cylinder direct injection spark-ignition engine as claimed in claim 4, wherein the axis of the fuel injector valve is directed into the circular cavity, the fuel injector valve being located between the first and second intake ports.

10. A cylinder direct injection spark-ignition engine as claimed in claim 4, wherein the swirl control valve is arranged to substantially block the first intake port under a predetermined engine operating condition in which stratified charge combustion is made in the combustion chamber.

11. A cylinder direct injection spark-ignition engine as claimed in claim 4, wherein the first and second intake ports are located on an opposite side of the third vertical plane with respect to the first and second exhaust ports.

12. A cylinder direct injection spark-ignition engine as claimed in claim 4, wherein the first predetermined angle is at least 5 degrees and smaller than 15 degrees.

13. A cylinder direct injection spark-ignition engine as claimed in claim 4, wherein the at least a major part of the axis of the second intake port forms a second predetermined angle relative to the block deck of the cylinder block, the second predetermined angle being within a range of larger than 30 degrees and smaller than 40 degrees.

14. A cylinder direct injection spark-ignition engine as claimed in claim 4, wherein the second angle is within a range of from 35 degrees to 45 degrees.

15. A cylinder direct injection spark-ignition engine, comprising:

a cylinder head that defines a portion of a combustion chamber and that holds a spark plug;

at least one intake valve and at least one exhaust valve movably disposed on the cylinder head; and a fuel injector that directly injects fuel into the combustion chamber, the fuel injector having an axis inclined relative to a plane forming a right angle with a longitudinal axis of the combustion chamber and that injects fuel from an intake valve side of the combustion chamber toward an exhaust valve side of the combustion chamber, the fuel injector having a fuel ejection hole with an axis inclined relative to the axis of the fuel injector toward the spark plug, wherein the fuel injector is arranged such that fuel injected through the fuel ejection hole has first and second sections on opposite sides of a plane containing the axis of the fuel ejection hole, the first section being located closer to the spark plug than the second section, the first section having a higher flow velocity than the second section.

16. A cylinder direct injection spark-ignition engine as claimed in claim 15, wherein the fuel injector injects fuel into the combustion chamber in the shape of a hollow cone.

17. A cylinder direct injection spark-ignition engine as claimed in claim 15, wherein the axis of the fuel ejection hole is substanlially contained in a plane passing through a tip end section of the spark plug.

18. A cylinder direct injection spark-ignition engine as claimed in claim 15, wherein the fuel injector has only one fuel ejection hole.

19. A cylinder direct injection spark-ignition engine as claimed in claim 15, wherein the injected fuel defines a spray angle that is greater than an angle of inclination between the axis of the fuel injector and the axis of the fuel ejection hole.

20. A cylinder direct injection spark-ignition engine as claimed in claim 15, wherein the fuel injector injects fuel above and below the axis of the fuel injector.

21. A cylinder direct injection spark-ignition engine as claimed in claim 15, wherein the fuel injector injects fuel during a compression stroke when stratified charge combustion occurs.

22. A cylinder direct injection spark-ignition engine as claimed in claim 15, further comprising:
 a first intake port and second intake port in the cylinder head; and
 a piston having a cavity,
 wherein an axis of the second intake port lies within a first plane and the first plane is generally tangential to a periphery of the cavity.

23. A cylinder direct injection spark-ignition engine, comprising:
 a cylinder head that defines a portion of a combustion chamber and that holds a spark plug;
 a cylinder block having a cylinder;
 at least one intake valve and at least one exhaust valve movably disposed on the cylinder head;
 a piston movably disposed in the cylinder so as to define a portion of the combustion chamber, the piston having a piston crown with a generally circular cavity having a center axis, which is offset from a center axis of the piston toward the intake valve;
 a spark plug having a tip end section disposed above a part of a peripheral portion of the circular cavity, which part is located closer to the center axis of the piston than to a periphery of the piston;
 a device that generates a swirl of intake air in the combustion chamber; and
 a fuel injector that directly injects fuel into the combustion chamber, the fuel injector having an axis inclined relative to a plane forming a right angle with a longitudinal axis of the combustion chamber and that injects fuel from an intake valve side of the combustion chamber toward an exhaust valve side of the combustion chamber, the fuel injector having a fuel ejection hole with an axis inclined relative to the axis of the fuel injector toward the spark plug;

wherein the fuel injector is arranged such that fuel injected through the fuel ejection hole has first and second sections which are on opposite sides of a plane containing the axis of the fuel ejection hole, the first section being located closer to the spark plug than the second section, the first section having a higher flow velocity than the second section.

24. A cylinder direct injection spark-ignition engine as claimed in claim 23, wherein the cylinder head includes first and second intake ports and first and second exhaust ports for the cylinder, and the swirl generating device includes a swirl control valve disposed to control air flow in the first intake port in accordance with an engine operating condition.

25. A cylinder direct injection spark-ignition engine as claimed in claim 24, wherein the swirl control valve is open during homogeneous charge combustion and closed during stratified charge combustion.

26. A cylinder direct injection spark-ignition engine, comprising:
 a cylinder block having a block deck and a plurality of cylinders that each define a combustion chamber;
 a cylinder head mounted on the block deck, the cylinder head having first and second intake ports and first and second exhaust ports for at least one of the cylinders;
 first and second intake valves movably disposed on the cylinder head to open and close the first and second intake ports;
 first and second exhaust valves movably disposed on the cylinder head to open and close the first and second exhaust ports;
 a spark plug having a tip end section projecting into the combustion chamber defined by the at least one cylinder;
 a fuel injector that directly injects fuel into the combustion chamber, the fuel injector having an axis inclined relative to a plane forming a right angle with a longitudinal axis of the at least one cylinder and that injects fuel from an intake valve side of the combustion chamber toward an exhaust valve side of the combustion chamber, the fuel injector having a fuel ejection hole with an axis inclined relative to the axis of the fuel injector toward the spark plug;
 a piston movably disposed in the at least one cylinder to define a portion of the combustion chamber, the piston having a piston crown with a generally circular cavity having a center axis which is offset from a center axis of the piston toward the intake valves; and
 a swirl control valve disposed to control air flow in the first intake port in accordance with an engine operating condition,
 wherein the second intake port has an axis with at least a major part contained in a first vertical plane inclined relative to a second vertical plane to form a first predetermined angle, the first vertical plane approaching the center axis of the piston while becoming closer to the center axis of the piston than the second vertical plane, the first and second vertical planes being vertical to the block deck of the cylinder block, the second vertical plane passing through the first intake valve and first exhaust valve and being perpendicular to a third vertical plane containing the center axes of the cylinders, the first intake valve and the first exhaust valve being located respectively on opposite sides of the third vertical plane, wherein the fuel injector is arranged such that fuel injected through the fuel ejection hole has first and second sections which are on opposite sides of a plane containing the axis of the fuel ejection hole, the first section being located closer to the spark plug than the second section, the first section having a higher flow velocity than the second section.

27. A cylinder direct injection spark-ignition engine as claimed in claim 26, wherein the first vertical plane is generally tangential to a periphery of the circular cavity.

28. A cylinder direct injection spark-ignition engine as claimed in claim 26, wherein the first vertical plane is generally parallel with a fourth vertical plane containing a tangent line of a periphery of the circular cavity.

29. A cylinder direct injection spark-ignition engine as claimed in claim 26, wherein the tip end section of the spark plug is disposed above a peripheral portion of the circular cavity and located On an opposite side of the first vertical plane with respect to the second vertical plane.

30. A cylinder direct injection spark-ignition engine as claimed in claim 26, wherein the first vertical plane passes through a space between a periphery of the circular cavity and the spark plug.

31. A cylinder direct injection spark-ignition engine as claimed in claim 24, wherein the axis of the fuel injector extends into the circular cavity, the fuel injector being located between the first and second intake ports.

32. A cylinder direct injection spark-ignition engine as claimed in claim 26, wherein the swirl control valve is arranged to substantially block the first intake port under a predetermined engine operating condition in which stratified charge combustion occurs in the combustion chamber.

33. A cylinder direct injection spark-ignition engine as claimed in claim 26, wherein the first and second intake ports are located on an opposite side of the third vertical plane with respect to the first and second exhaust ports.

34. A cylinder direct injection spark-ignition engine as claimed in claim 26, wherein the first predetermined angle is at least 5 degrees and smaller thin 15 degrees.

35. A cylinder direct injection spark-ignition engine as claimed in claim 26, wherein the at least a major part of the axis of the second intake port forms a second predetermined angle relative to the block deck of the cylinder block, the second predetermined angle being within a range of larger than 30 degrees and smaller than 40 degrees.

36. A cylinder direct injection spark-ignition engine as claimed in claim 26, wherein the axis of fuel injector forms a third predetermined angle relative to the block deck of the cylinder block, the third predetermined angle being within a range of from 35 degrees to 45 degrees.

37. A cylinder direct injection spark-ignition engine, comprising:

a cylinder head that defines a portion of a combustion chamber and that holds a spark plug;

a cylinder block having a cylinder;

at least one intake valve and at least one exhaust valve movably disposed on the cylinder head;

a piston movably disposed in the cylinder so as to define a portion of the combustion chamber, the piston having a piston crown with a generally circular cavity having a center axis, which is offset from a center axis of the piston toward the intake valve;

a spark plug having a tip end section disposed above a part of a peripheral portion of the circular cavity, which part is located closer to the center axis of the piston than to a periphery of the piston;

a valve that generates a swirl of intake air in the combustion chamber; and a fuel injector that directly injects fuel into the combustion chamber, the fuel injector having an axis inclined relative to a plane forming a right angle with a longitudinal axis of the combustion chamber and that injects fuel from an intake valve side of the combustion chamber toward an exhaust valve side of the combustion chamber, the fuel injector having a fuel ejection hole with an axis inclined relative to the axis of the fuel injector toward the spark plug;

wherein the fuel injector is arranged such that fuel injected through the fuel ejection hole has first and second sections which are on opposite sides of a plane containing the axis of the fuel ejection hole, the first section being located closer to the spark plug than the second section, the first section having a higher flow velocity than the second section.

38. A cylinder direct injection spark-ignition engine, comprising:

intake and exhaust valves movably disposed on a cylinder head which defines a portion of a combustion chamber; and a fuel injector valve for directly injecting fuel into the combustion chamber, the fuel injector valve having an axis inclined relative to a bottom surface of the cylinder head and that gradually approaches the bottom surface in a direction extending from an intake valve side of the combustion chamber toward an exhaust valve side of the combustion chamber, the fuel injector valve having a fuel ejection hole with an axis inclined relative to the axis of the fuel injector valve so as to form a first angle which is smaller than a second angle formed by the axis of the fuel injector valve and the bottom surface of the cylinder head, wherein an angle formed by the axis of the fuel ejection hole and the bottom surface of the cylinder head is smaller than the second angle, and wherein the fuel injector valve is arranged such that fuel injected through the fuel ejection hole is formed into a shape of a spray cone having first and second sections which are opposite to each other with respect to a plane containing the axis of the fuel ejection hole, the first section being located closer to a surface of the cylinder head defining a portion of he combustion chamber than the second section, the first section having a higher flow velocity than the second section.

39. A cylinder direct injection spark-ignition engine, comprising;

a cylinder head that defines a portion of a combustion chamber and that holds a spark plug;

at least one intake valve and at least one exhaust valve movably disposed on the cylinder head; and a fuel injector that directly injects fuel into the combustion chamber, the fuel injector laving an axis inclined relative to a plane forming aright angle with a longitudinal axis of the combustion chamber and that injects fuel from an intake valve side of the combustion chamber toward an exhaust valve side of the combustion chamber, the fuel injector having a fuel ejection hole with an axis inclined relative to the axis of the fuel injector, wherein an angle formed by the axis of the fuel ejection hole and the plane is smaller than an angle formed by the axis of the fuel injector valve and the plane, and wherein the fuel injector is arranged such that fuel injected through the fuel ejection hole has first and second sections on opposite sides of a plane containing the axis of the fuel ejection hole, the first section being located closer to the spark plug than the second section, the first section having a higher flow velocity than the second section.

40. A cylinder direct injection spark-ignition engine, comprising:

a cylinder head that defines a portion of a combustion chamber and that holds a spark plug;

at least one intake valve and at least one exhaust valve movably disposed on the cylinder head; and a fuel injector that directly injects fuel into the combustion chamber, the fuel injector having an axis inclined relative to a plane forming a right angle with a longitudinal axis of the combustion chamber and that injects fuel from an intake valve side of the combustion chamber toward an exhaust valve side of the combustion chamber, the fuel injector including means for injecting the fuel such That the fuel has first and second sections, the first section being located closer to the spark plug than the second section, and the first section having a higher flow velocity than the second section.

* * * * *